United States Patent [19]

Flair

[11] 4,122,609

[45] Oct. 31, 1978

[54] MACHINE FOR TRACING THE PROFILE OF AN ORBITING STAR GEAR

[75] Inventor: Henry J. Flair, Franklin Park, Ill.

[73] Assignee: Illinois Tool Works Inc., Chicago, Ill.

[21] Appl. No.: 793,976

[22] Filed: May 5, 1977

[51] Int. Cl.$^2$ .................... B23F 23/08; B24B 5/26; B23F 5/27

[52] U.S. Cl. .................... 33/174 P; 51/287; 51/95 GH; 90/3; 33/179.5 E

[58] Field of Search .................. 90/3; 51/287, DIG. 1, 51/95 GH; 33/179.5 R, 179.5 D, 179.5 E, 174 P

[56] References Cited

U.S. PATENT DOCUMENTS

| | | | |
|---|---|---|---|
| 2,775,041 | 12/1956 | Pomernacki | 33/179.5 R |
| 2,861,502 | 11/1958 | Caubet | 90/3 |
| 3,069,779 | 12/1962 | Bauer et al. | 33/179.5 R |
| 4,052,928 | 10/1977 | Pierrat et al. | 90/3 |

Primary Examiner—Othell M. Simpson
Assistant Examiner—Gil Weidenfeld

Attorney, Agent, or Firm—Glenn W. Bowen; Robert W. Beart

[57] ABSTRACT

A machine which may be used to either check or to machine the profile of an orbiting star gear for a gerotor type of fluid motor or pump is disclosed. The profile of a star gear is traced due to the interaction of a slide that carries a sensor, or a machining tool, in a back and forth direction toward and away from the star gear and in a second direction transverse to this back and forth direction with respect to a frame member. The slide is driven by an eccentric disc, at a rate which is determined in accordance with the number of teeth on the specific star gear in question. The combined motion of the star gear and the two slides causes the sensor, or the machining tool, to trace out the profile of the desired star gear for the purpose of either checking its profile, or of machining a new gear. A spring member is connected to the frame member to allow the frame member to move in a transverse direction but without rotation.

6 Claims, 5 Drawing Figures

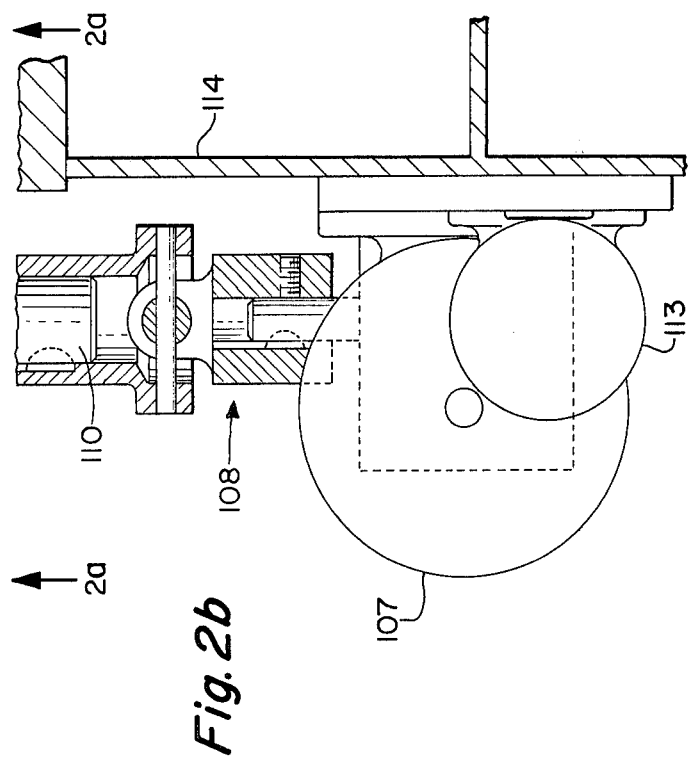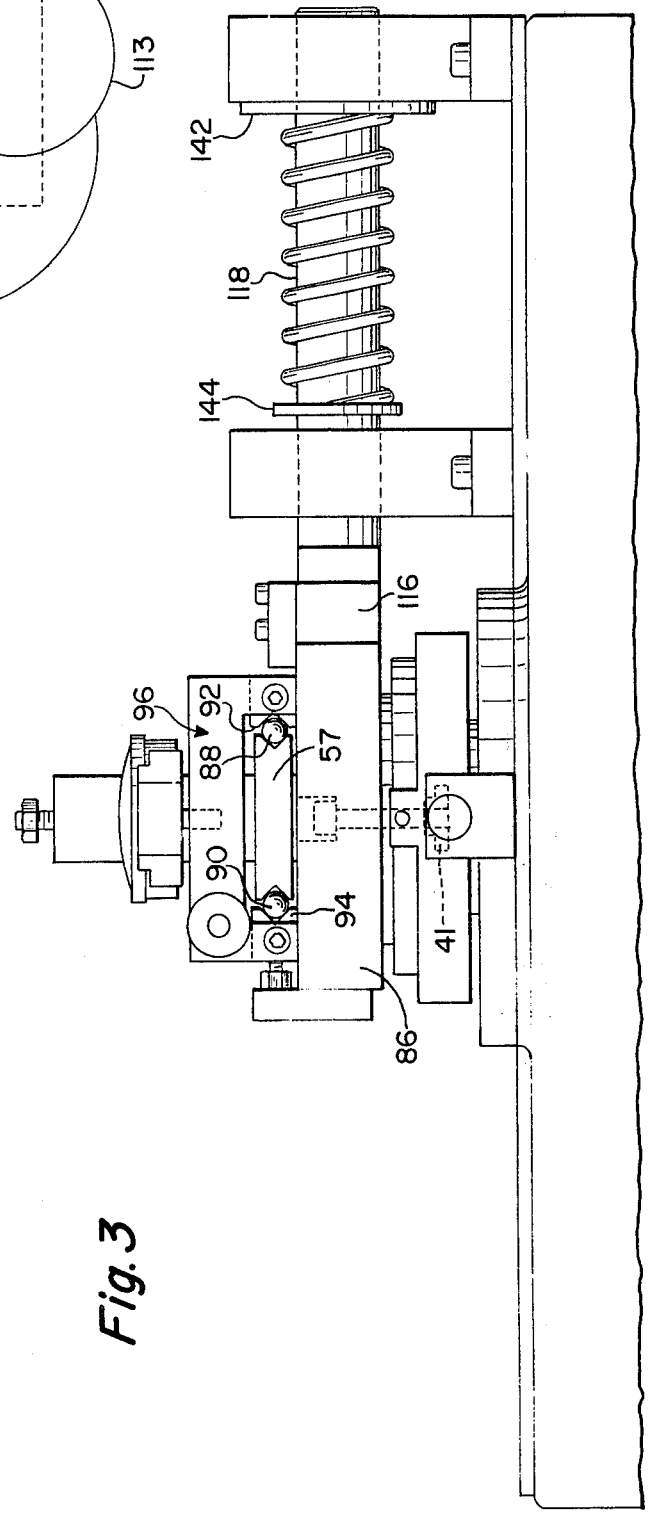

MACHINE FOR TRACING THE PROFILE OF AN ORBITING STAR GEAR

BACKGROUND OF THE INVENTION

Mechanisms known as gerotors, which are fluid pressure devices that form expansable and contractable chambers, are well known. One particular type of gerotor device that has found commercial acceptance is formed with a generally cylindrical shaped casing which is annular and has a number of internal teeth. An external tooth star member, or gear, having at least one fewer tooth than the casing, or ring member, has its teeth in meshing engagement with teeth of the ring member. The star gear partakes of a hypocycloidal movement so that the axis of the star gear travels in an orbit about the axis of the ring member.

Various versions of gerotor mechanisms which use an orbiting star gear, of the type that is the subject of the present invention, are shown in U.S. Pat. No. 1,682,563, issued Aug. 28, 1928 to Myron F. Hill; U.S. Pat. No. 3,283,723, which issued Nov. 8, 1976 and which was assigned on its face to the Germane Corporation; U.S Pat. Re. No. 25,291, issued Dec. 4, 1962 which was assigned on its face to the Germane Corporation; and in the following United States patents which were assigned on their face to the Chr-Lynn Company; U.S. Pat. No. 3,270,683, issued Sept. 8, 1966, U.S. Pat. No. 3,272,142, issued Sept. 13, 1966, and U.S. Pat. No. 3,514,234 issued May 26, 1970.

In the past, the accurate machining and checking of the profile of a star gear has proven to be troublesome. In particular, it has proven to be especially difficult to check with high accuracy the profile of a star gear with standard gear checking equipment. The present invention is directed to a machine which traces the profile of a star gear in a highly accurate manner and which, thus, may be used either to test the profile of a completed star gear for accuracy or, alternatively, to generate a very precisely formed star gear from a cylindrical workpiece.

DESCRIPTION OF THE DRAWINGS

The present invention is described by reference to the drawings in which:

FIG. 2b is the lower portion of the side cross-sectional view of the machine of FIG. 1 which may be joined with FIG. 2a by overlapping the Lines 2a of FIG. 2b with the Lines 2b of FIG. 2a;

FIG. 3 is an end view of the machine of FIG. 1; and

TECHNICAL DESCRIPTION OF THE INVENTION

Figure 1:
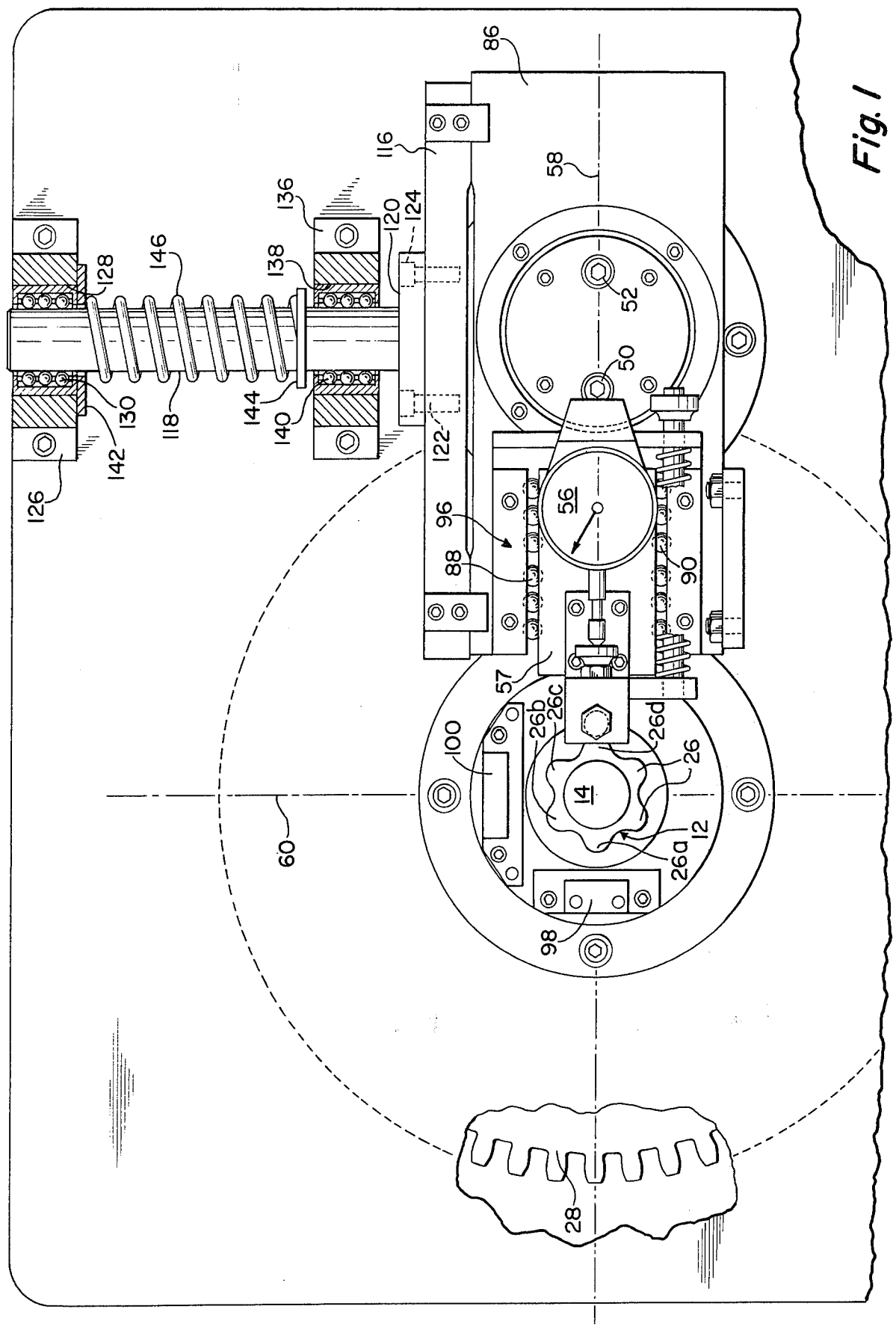
FIG. 1 is a top view of the tracing machine of the present invention when used as a profile checker.

The machine of the present invention, when it is used to check the profile of a star gear, is shown by reference to FIGS. 1-4. The machine includes a frame 10 which is used to support the other machine elements. The star gear 12 is mounted on a revolvable shaft 14 with an axis 15, which is supported for rotation in the bore 16 by the bearings 18, 20. The upper end of the shaft 14 has a reduced diameter section 22, over which the central aperture 24 of the star gear is placed so as to hold it on the reduced portion which tapers outwardly slightly from the top to the bottom of the section 22.

In the version of the machine shown in the drawings, the star gear 12 has six nodes or teeth 26. The lower end of the shaft 14 carries a large gear 28 mounted on a hub 29, which meshes with a smaller gear 30 that is coupled to the bottom end of a second shaft 32, which has an axis 33 parallel to the axis 15 and which has its axis 33 parallel to the axis 15 of the shaft 14. The ratio of the number of teeth on the large gear 28 to the number of teeth on the small gear 30 is determined by the number of nodes or teeth of the star gear. In the illustrated embodiment, therefore, the large gear has six times as many teeth as the small gear 30.

The shaft 32 having an axis 33, is supported in the bore 34 by the bearings 36, 38. The upper end of the shaft 32 supports a mounting block 40 which has a "T" slot 41 provided in it to receive locking nuts 42, 44 for the corresponding bolts 50, 52 which are used to secure, and to allow for adjustment of, a large eccentric disc 54 to the block 40. The purpose of the eccentric disc 54 is to provide for oscillation of the profile indicator 56 in a direction back and forth toward the star gear 12 in the direction of the imaginary line 58 of FIG. 1, and also to provide for simultaneous motion of the pressure indicator 56 in the direction of the line 60 which is normal to the line 58 while the star gear 12 rotates about its axis. These two combined movements allow the sensing roller 62, which is abutted against the profile of the gear 12, to trace out a path of a "perfect" star gear. Any deviations from this "perfect" star gear are thereby indicated by the indicator 56.

The roller 62 is supported between the centers 64, 66 with the upper center 66 being biased downward by means of the spring 68 through a controlled amount of pressure that is supplied by the adjusting screw 70. The lower end of the spring coil 68 is abutted against the disc 72 on the lower end of the adjusting screw 70 while the upper end is abutted against the upper surface 74 of the E-shaped support member 76. The pressure plate 78 is screwed into the E-shaped member 76 and abuts against the probe tip 80 of the conventional pressure indicator 56. The amount of pressure, that is initially provided between the probe 80 and the pressure plate 78, can be controlled by means of the adjusting knob 82 which adjusts the amount of compression of the spring 84 as desired.

The indicator 56 may also include an electrical pickup so that an electrical signal may be fed to an electrical recording device. The indicator 56 is mounted on a floating slide member 57 which is free to move back and forth. Ball bearings 88, 90 are provided in the ball races 92, 94 respectively, to allow for free movement of the indicator 56 and its slide support member 57 with respect to the housing 96 which is secured to the slide 86.

The initial location of the star gear 12 on the section 22 is provided by the use of jo blocks which are inserted between the precision flat-surfaced stationary measuring blocks 98, 100 that are positioned at a right angle with respect to each other. A jo block between the test 98 and the high portion of the tooth 26a will insure, in combination with a jo block placed between the test block 100 and the teeth 26b, 26c, that the star gear 12 is accurately initially positioned, as shown in FIG. 1, with the center of the tooth 26d being in line with the center of the roller 62. The adjustment pin 102, shown in FIG. 2, is used when locating and initially locking the eccentric when a new star gear has been mounted in place. The adjusting screws 104, 106 are used to adjust the eccentricity of the disc 54.

Figure 2A:
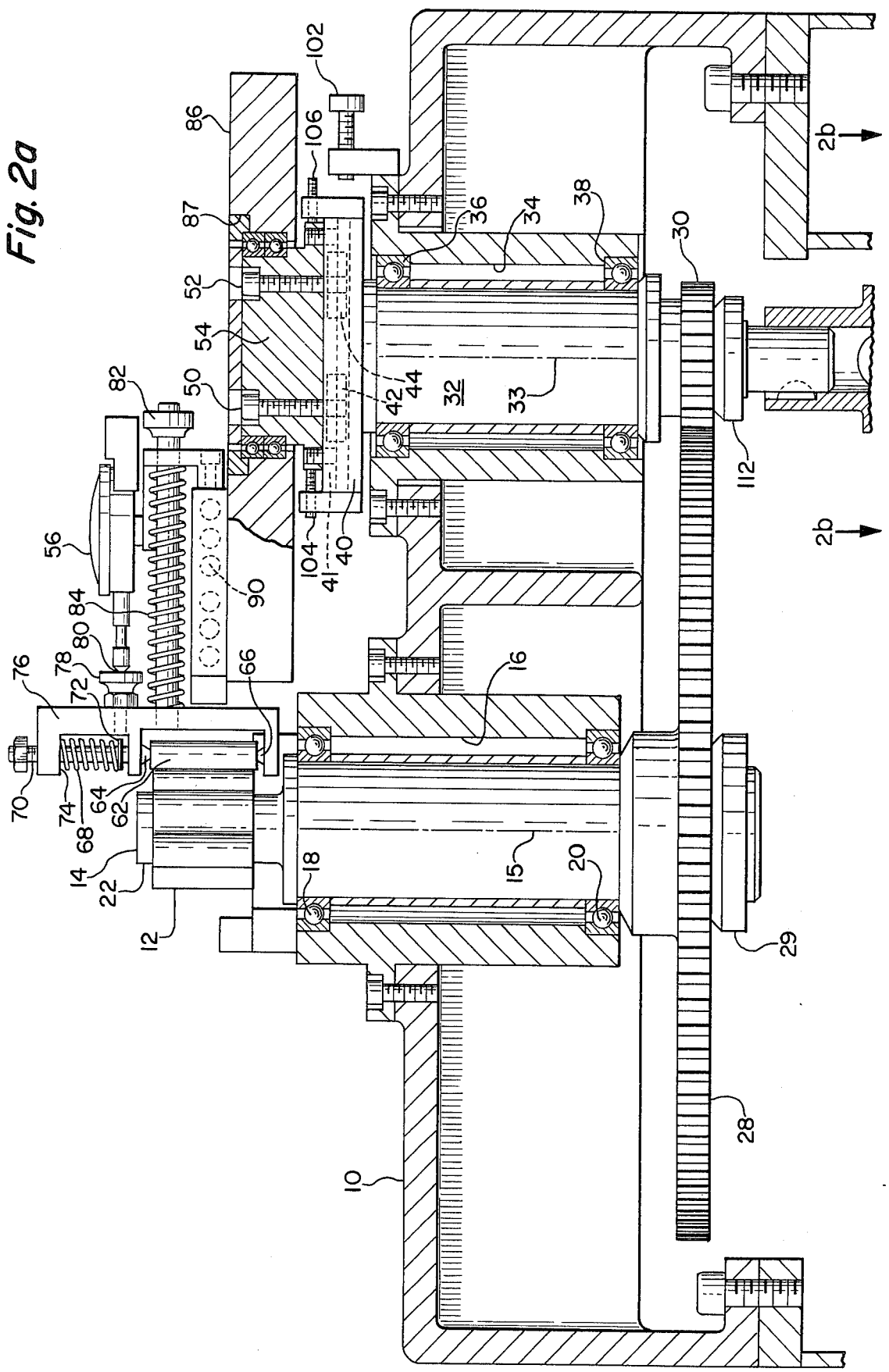
FIG. 2a is an upper portion of a cross-sectional view of the machine of FIG. 1 taken along the Lines 2—2 of FIG. 1.

The type of drive for the shaft 32 that is employed is not critical to the invention. FIG. 2b illustrates a representative type of drive mechanism. The relative position of FIG. 2a with respect to FIG. 2b is indicated by the lines 2a and 2b wherein the correct relative location is achieved by overlapping these numerals of the corresponding figures. The motor 107 is utilized to drive a conventional gear reduction mechanism 108, which in turn is coupled to drive the shaft 110 that is in turn connected to the hub 112, which supports the gear 30. A second motor 113 may be mounted on a downwardly extending frame member 114, if desired, to drive the paper supply of a recorder coupled to the electrical pickup section of the indicator 56.

The back and forth motion of the slide 86 along the line 58 is achieved merely by moving the slide 86 relative to the support plate 116. The slide 86 has a central opening 87 which receives the eccentric disc 54 therein. Control of the motion of the slide 86 in the direction along the line 60 normal to the line 58, however, is achieved in a completely different manner. A shaft 118 is secured to a base 120 which in turn is secured to the support plate 116 by means of the bolts 122, 124. The shaft 118 has one end supported in a support member 126 which has an aperture 128 for receiving the shaft 118 and a ball bushing 130 which allows this end of the shaft 132 to move freely back and forth in the direction of line 58 with respect to the support member 126. Similarly, the other end of the shaft is supported in a second support member 136 which also is provided with an aperture 138 which has a ball bushing 140 therein which allows this end of the shaft to move in the direction of line 58. A pair of discs 142 and 144 are provided to compress the spring 146 which is positioned around the shaft 118 between the discs 142, 144. The spring 146 thereby tends to supply a forward bias to the shaft 118 since the plate 142 is secured to the support member 126 while the plate 144 is secured to the shaft 118. The combination of the above described elements thereby allows the oscillating slide 86 to move in the direction of the line 60 which is normal to the back and forward motion of the slide along the line 58. Since the indicating roller 62 is secured to the oscillating slide 86, it thus traces out the desired profile of a "perfect" star gear.

Figure 4:
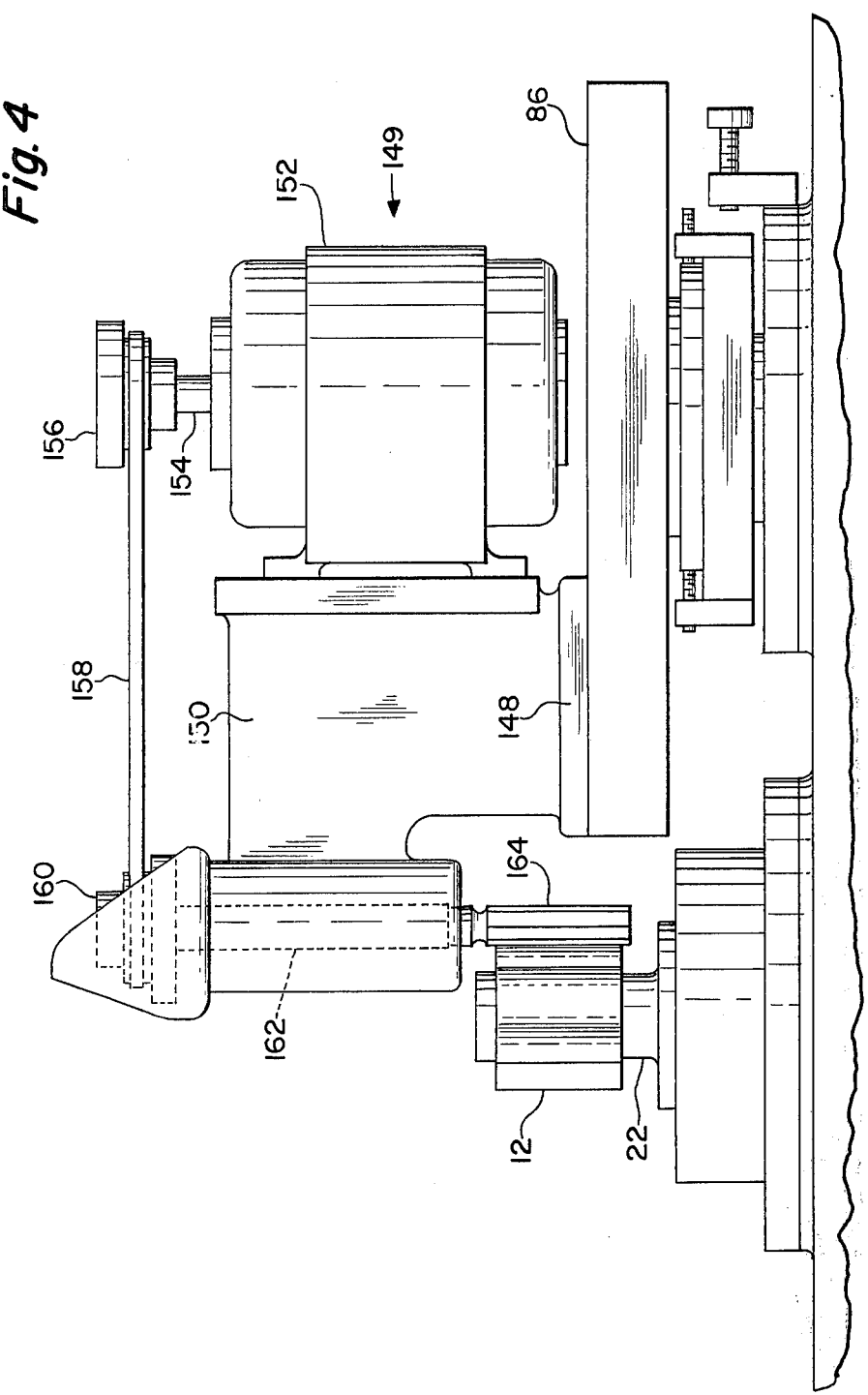
FIG. 4 is a partial side view of the invention when it is modified so as to be capable of machining a star gear, instead of checking its profile in accordance with the embodiment of FIGS. 1-4.

If, instead of checking the profile of the star gear, it is desired to generate a star gear, the indicator 56 and the roller 62 may be replaced by the generating mechanism 149, as shown in FIG. 4. The generating mechanism 149 shown in FIG. 4 may be secured to the slide 86 by means of a magnetic base plate, or other means of support, which supports the housing 150 that in turn supports the vertically mounted electrical motor 152. The motor 152 has a shaft 154 connected to a number of speed control wheels 156. The speed control wheels 156 are driven by a belt 158 that is coupled to a second group of speed control wheels 160. The speed control wheels 160 are secured to the upper end of the shaft 162 which drives a milling cutter 164 that is connected to the lower end of the shaft 162. The generating mechanism 149 and the milling cutter 164 of FIG. 4 will thus undergo the same motion that the indicator 56 and the roller 62 of FIGS. 1-4 underwent. A star gear of a highly accurate configuration may be thereby generated by use of the same basic machine with the generating mechanism of FIG. 4 replacing the oscillating slide member 57 and the indicating mechanism 56 that is used when the profile of a star gear is being checked.

The basic mechanism of the present invention, therefore, can be used to both generate and to check the profile of an orbiting star gear. Moreover, every point on the star gear, when the machine is used as a checking machine, is checked since each degree of rotation of the eccentric 54 is correlated with the same amount of rotation of the star gear 12, due to the fact that both the eccentric and the star gear are rotated in unison, the star gear undergoing a rotational motion while the checking rotary slide, or the generating mechanism, undergoes motion both in a back and forth direction along the line 58 and in the direction normal to the line 58 along the line 60.

What is claimed is:

1. A machine for checking the profile of an ideal orbiting star gear which comprises a predetermined number of teeth comprising first support means for supporting said star gear, first rotational drive means for rotating said first support means and said star gear at a predetermined angular velocity, profile checking means positioned adjacent said star gear, second support means for supporting said profile checking means, an eccentric second rotational drive means coupled to said eccentric for rotating said eccentric at an angular velocity that is substantially equal to the angular velocity of said star gear multiplied by said number of teeth, said eccentric being coupled to said second support means in a manner so that it drives said profile checking means back and forth along a line that passes through the center of said star gear and guide means coupled to said second support means which allows said profile checking means to also be driven by said eccentric in a direction substantially normal to said line without substantial rotation of said profile checking means occuring.

2. A machine as claimed in claim 1, wherein said first rotational drive means comprises a first vertically disposed shaft, the upper end of which receives said star gear so that the central axis of said star gear is aligned in a vertical direction and said second rotational drive means comprises a second vertically disposed shaft, the upper end of which is coupled to said eccentric and a relatively large gear is coupled to the lower end of said first shaft while a relatively smaller gear is coupled to the lower end of said second shaft which meshes with said first gear, wherein the ratio of the number of teeth on the large gear to the number of teeth on the smaller gear is equal to said predetermined number of teeth associated with said star gear.

3. A machine as claimed in claim 2, wherein said first support means comprises slide means that is constructed to be slideably movable back and forth along said line in response to the interaction of a star gear on said first support means and said profile checking means.

4. A machine as claimed in claim 3, wherein said profile checking means comprises an elongated cylindrically-shaped sensing means that has a longitudinal axis that is substantially vertically disposed and that contacts said star gear.

5. A machine as claimed in claim 4, wherein said guide means comprises a support plate against which said second support means slides as said profile checking means is driven back and forth along said line, a third shaft having an axis substantially normal to said line coupled to said support plate, bias means tending to force said third shaft toward said support plate and bearing means which allow said third shaft and said support plate to be driven by said eccentric against said bias means in said normal direction for a limited extent.

6. A machine as claimed in claim 5, wherein first and second precision flat-surfaced measuring blocks are positioned at a right angle with respect to each other and are located adjacent said star gear on said first support means so as to form locating surfaces for jo blocks in order to insure precise initial positioning of said star gear on said machine.

* * * * *